United States Patent [19]

Beckman

[11] Patent Number: 4,929,349
[45] Date of Patent: May 29, 1990

[54] BIO-FILTRATION APPARATUS AND METHOD FOR WASTEWATER TREATMENT

[76] Inventor: William J. Beckman, 842 Ohio Pike, Cincinnati, Ohio 45245

[21] Appl. No.: 236,515

[22] Filed: Aug. 24, 1988

[51] Int. Cl.⁵ .............................................. C02F 3/06
[52] U.S. Cl. ................................. 210/151; 210/220; 210/311; 210/521
[58] Field of Search ............... 210/150, 151, 220, 306, 210/311, 521, 532.1, 532.2

[56] References Cited

U.S. PATENT DOCUMENTS

| | | | |
|---|---|---|---|
| 2,480,320 | 8/1949 | Carrier | 210/324 |
| 3,104,222 | 9/1963 | Fuehring | 210/207 |
| 3,227,429 | 1/1966 | Renzi | 210/150 |
| 3,450,264 | 6/1969 | Graybill | 210/521 |
| 3,607,104 | 9/1971 | Blickle et al. | 210/320 |
| 3,750,887 | 8/1973 | Carlson | 210/150 |
| 3,764,253 | 10/1973 | Goodman et al. | 425/466 |
| 3,925,205 | 12/1975 | Sparham | 210/521 |
| 3,951,817 | 4/1976 | Snyder | 210/521 |
| 4,002,540 | 1/1977 | Bixby | 204/24 |
| 4,039,437 | 8/1977 | Smith et al. | 210/150 |
| 4,045,344 | 8/1977 | Yokota | 210/151 |
| 4,190,543 | 2/1980 | Pederson et al. | 210/332 |
| 4,231,863 | 11/1980 | Sutphin | 210/151 |
| 4,498,985 | 2/1985 | Atkinson et al. | 210/151 |

FOREIGN PATENT DOCUMENTS

| | | |
|---|---|---|
| 881668 | 9/1971 | Canada . |
| 62-279889 | 12/1987 | Japan . |
| 548850 | 5/1978 | Switzerland . |
| 1313810 | 7/1985 | U.S.S.R. . |

Primary Examiner—Peter Hruskoci
Assistant Examiner—Christopher Upton
Attorney, Agent, or Firm—Wood, Herron & Evans

[57] ABSTRACT

Disclosed herein is a bio-filtration system that provides excellent solids removal and carbonaceous B.O.D. and ammonia nitrogen removal and which comprises in combination a tank, wedge wire panels disposed horizontally therein, a fixed film media reactor with vertical channels therein, and means for introducing effluent to be treated into said tank whereby said effluent flow upwardly through said fixed film media reactor and then through said wedge wire panels.

5 Claims, 3 Drawing Sheets

BIO-FILTRATION APPARATUS AND METHOD FOR WASTEWATER TREATMENT

BACKGROUND OF THE INVENTION

Current discharge requirements for treated wastewater from sewage treatment plants generally call for a degree of suspended solids removal unattainable by secondary treatment technology on a predictable and uniform basis. For example, the standards currently applicable in Ohio are 8 mg/L monthly B.O.D. (Biochemical Oxygen Demand) average and 12 mg/L B.O.D. maximum weekly average. Various types of tertiary treatment techniques and devices have been employed, such as slow sand filtration, rapid gravity sand filtration, spray irrigation and polishing lagoons. Prior art patents have disclosed various tertiary treatment equipment and methods, as for example those disclosed in U.S. Pat. No. 4,190,543, U.S. Pat. No. 3,925,205 and in U.S. Pat. No. 3,774,770.

In addition to the removal of these suspended solids it is desirable to remove other contaminants which also exist in the effluent from a secondary treatment. It has been recognized that in the treatment of wastewater a process can be used in which various contaminants are decomposed by microorganisms. More particularly, it is known that when organic substances are subjected to various conditions insofar as temperature and oxygen are concerned that certain desirable aerobic microorganisms are created which decompose certain organic substances and convert them into non-harmful materials such as carbon dioxide, water and the like. In this connection U.S. Pat. No. 4,045,344 discloses a method wherein a bundle of straight tubes or the like are used in what is called a "submerged packing process." In this method the packings are submerged in wastewater in a treating tank and the wastewater is circulated through the packings under aeration so that aerobic microorganisms are generated on the surface of the individual packings aerobic as films. These films decompose various organic substances coming into contact with the films. The patent describes the importance of maintaining turbulent flow through the entire length of the packings and states that turbulent flow is preferred for the propagation of the aerobic microorganisms (see column 4 lines 38–60).

In U.S. Pat. No. 4,190,543, incorporated by reference herein, there is disclosed a tertiary treatment method for removing suspended solids which has proven to be commercially successful. In this process wedge wire media panels are positioned within the treatment tank and are inclined with respect to the vertical axis of the sidewalls. In operation a biological mat is established on the media panels. Canadian Pat. No. 881,668 and U.S. Pat. No. 3,774,770 disclose waste treatment apparatus wherein wedge wire media panels are also utilized.

The principle objectives of the present biofiltration invention have been to provide a tertiary treatment apparatus which provides for a high degree of suspended solids removal and in addition a high degree of carbonaceous B.0.D. and ammonia nitrogen removal. It is a further objective of this invention to provide such a treatment facility wherein continuous operation can be obtained over a wide range of conditions and when cleaning is required sludge buildup may be easily removed from the system.

SUMMARY OF THE INVENTION

It has been found that excellent solids removal and carbonaceous B.O.D. and ammonia nitrogen removal can be achieved in the bio-filtration system of the present invention. The tank and much of the auxiliary equipment used is substantially identical to that shown in U.S. Pat. No. 4,190,543, incorporated by reference herein. Wedge wire panels are used for suspended solids removal. However, rather than utilizing wedge wire media panels in an inclined position as shown in the '543 patent, the panels are positioned in a more conventional, horizontal fashion. In addition, immediately below the horizontally mounted wedge wire media panels is positioned a tubular, fixed film media reactor. This provides a surface on which the aerobic microorganisms grow. These two in combination provide excellent solids removal and excellent carbonaceous and nitrogenous B.O.D. removal. While I do not wish to be bound by any particular theory it appears that this is due to the use of the horizontal wedge wire panel, which when used in combination with the fixed film media reactor creates a laminar flow throughout the entire fixed film media tubes. The wedge wire forces the flow to pass through all segments of the fixed film reactor, utilizing all the surface area with even loading conditions. This is in contrast to the teaching in U.S. Patent No. 4,045,344. As a result provides a much more efficient system is provided. The present invention therefore provides a tertiary treatment system which efficiently removes suspended solids and certain organic contaminants.

DETAILED DESCRIPTION OF THE INVENTION

Following is a description of the invention with reference to the accompanying diagramatic drawings, in which.

Additional pertinent drawing details of the tank may be found in U.S. Pat. No. 4,190,543 which has already been incorporated by reference herein.

Figure 1:
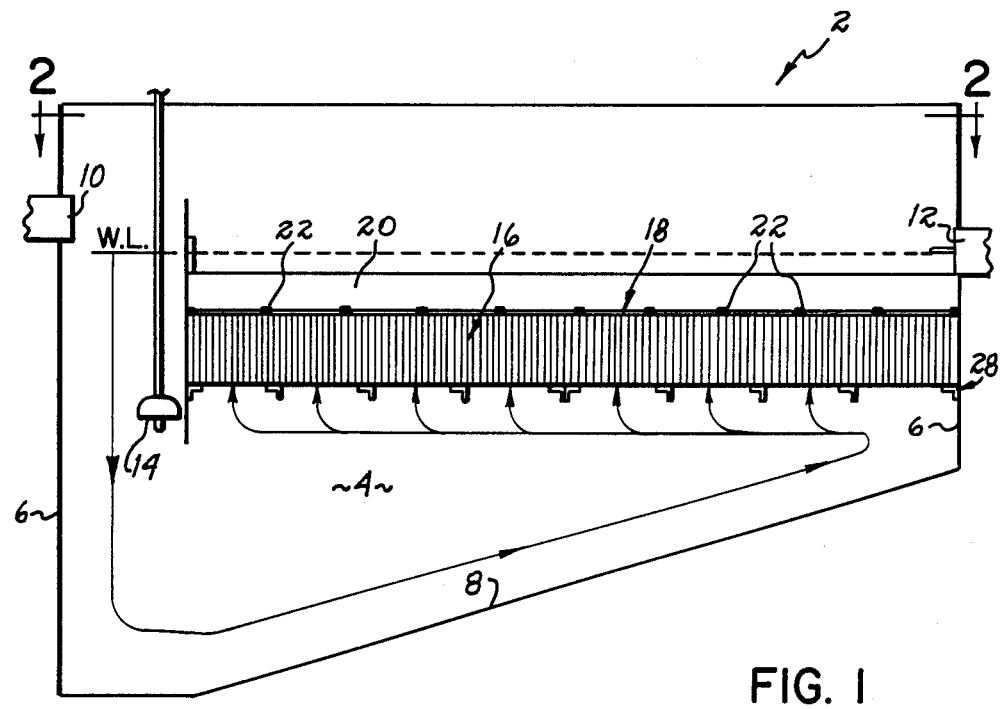
FIG. 1 is a cross-sectional view of a rectangular waste treatment tank.

The waste treatment tank 2 of the present invention has external sidewalls 4, end walls 6 and a sloped bottom wall 8. All may be made of concrete or steel. An inlet 10 is provided in one end wall 6 for introducing the effluent to be treated while at the opposite end wall 6 an outlet 12 for the treated material is provided. Pre-aeration diffusers 14 of a conventional design are provided through which air is introduced into the waste material. FIG. 1 shows the direction of travel of the effluent into the tank 2, into the fixed film media reactor 16, through the wedge wire media panels 18 and then into an effluent trough 20 and then out through the outlet 12. Tests have demonstrated the uniformity of flow and evenness of loading throughout the system.

Figure 2:
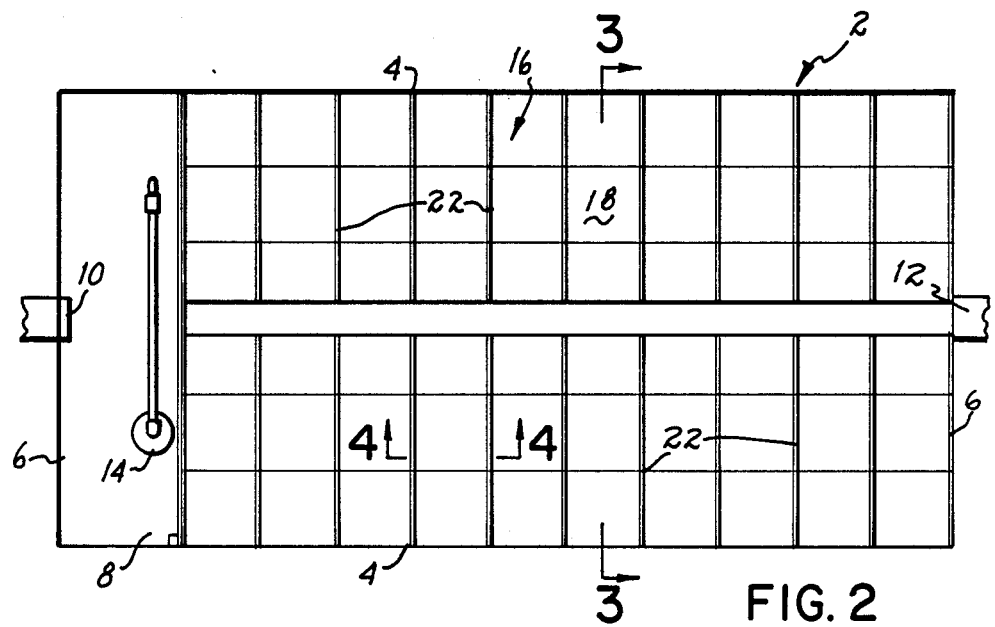
FIG. 2 is a plan view of the tank taken on line 2—2 of FIG. 1.
Figure 3:
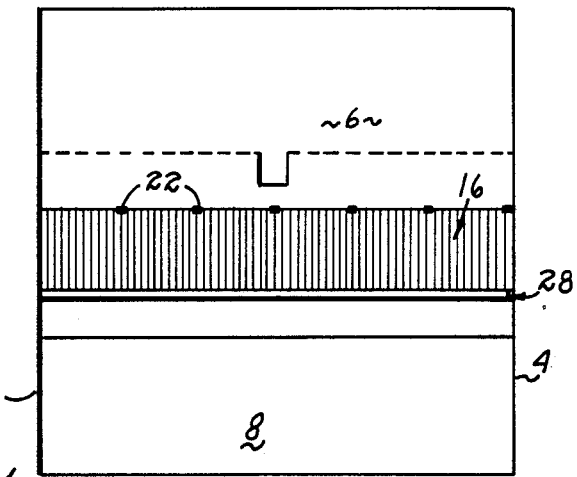
FIG. 3 is a section on line 3—3 of FIG. 2.
Figure 4:
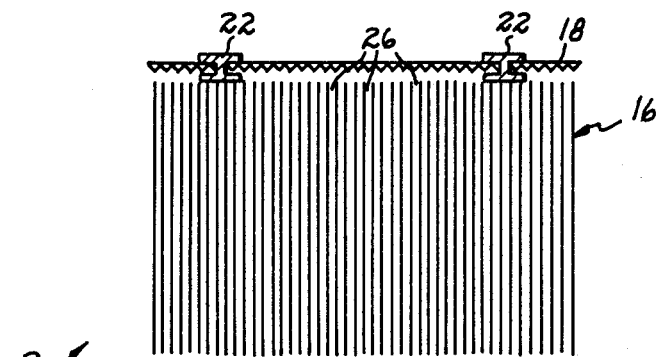
FIG. 4 is a section on line 4—4 of FIG. 2.

The wedge wire media panels 18 are of conventional design and are described in more detail in U.S. Pat. No 4,190,543. See also Canadian Pat. No. 881,668. As shown in FIGS. 1 and 2 they are horizontally disposed across most of the tank 2. Any type of suitable frame means and fastening means can be used, as for example, the wedge wire media frame 22 shown. In one application, wedge wire panels 18 made from polyethelene and having the dimensions of 12"×12 ⅜"× ⅜" were used.

In the operation of prior art treatment systems with horizontally disposed wedge wire panels it has been noted that as effluent passes upwardly through the tank and through the wedge wire panels, a high pressure zone and a laminar flow zone are established.

Figure 5:
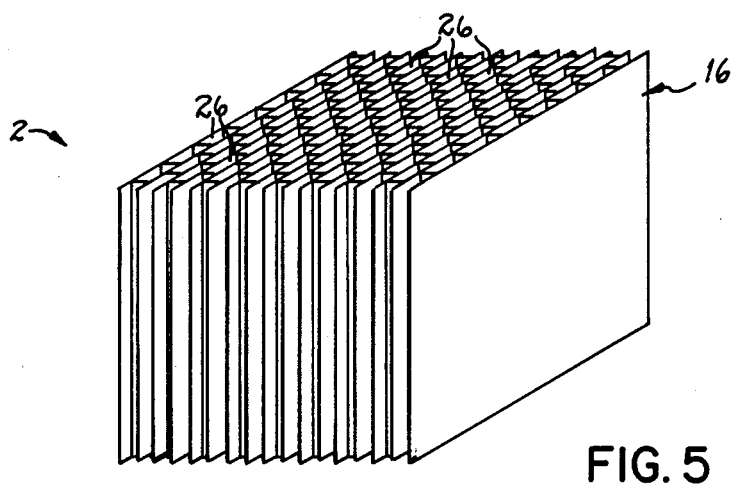
FIG. 5 is an isometric view of the fixed film media reactor.
Figure 6:
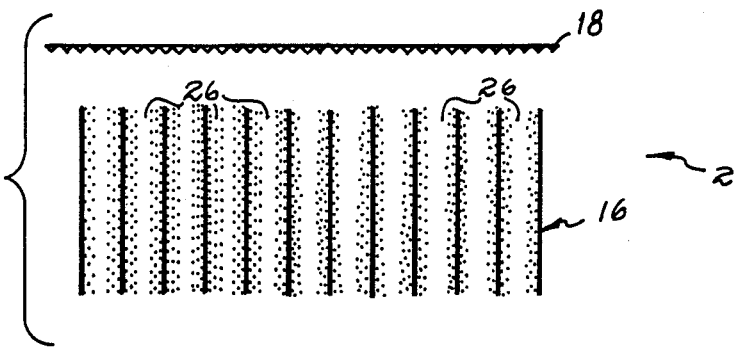
FIG. 6 is a cross-sectional view of the fixed film media reactor and wedge wire media.
Figure 7:
FIG. 7 is a cross-sectional view of the wedge wire media.

Mounted below the wedge wire media panels 18 in the present system is a fixed film media reactor 16. An isometric view of such is shown in FIG. 5. The surfaces of the tubular-like fixed film reactor 16 provide surfaces for biota (aerobic microorganism) growth and attachments. This biota acts as a scavenger by feeding on the untreated carbonaceous B.O.D. and nitrogeneous B.O.D.

As shown in FIG. 5 the reactor 16 comprises tubes or channels 26. These are generally rectangular in cross-section or if desired they may be more circular in cross-section. In one application it has been determined that the passageways are about 5MM on each side and the length of the tubes 26 is about 300MM. The reactor is sized so as to have about 175 square feet of surface area for each cubic foot of media. The fixed film media is to provide a surface on which biota can grow. This area =175 sq.ft./cu.ft. or stated in another way 1 cubic foot of the fixed film media 16 provides 175 square feet of surface area.

The fixed film reactor media 16 is positioned immediately below the wedge wire media panels 18 by means of a media support frame 28. The fixed film reactor 16 is positioned and constructed such that the flow of effluent passes upwardly through it and then through the wedge wire media panels 18. The use of the wedge wire panels 18 establishes laminar flow throughout the fixed film media reactor 16.

From the following table the surface area required in the fixed film media reactor 16 may be calculated based on ammonia nitrogen (Nitrogeneous B.O.D.) reduction.

TABLE

RECOMMENDED MAXIMUM LOADING RATE

SUMMER MONTHS WITH TEMPERATURE 18 TO 22 DEGREES CELSIUS

| EFFLUENT LIMITATION | MEDIA REQUIRED PER POUND NH3 |
| --- | --- |
| 2 mg/l up | 4,000 sq. ft./lb. NH3 |
| 1.5 mg/l | 5,000 sq. ft./lb. NH3 |
| 1 mg/l | 7,000 sq. ft./lb. NH3 |

WINTER MONTHS WITH TEMPERATURE TO 11 DEGREES CELSIUS

| | |
| --- | --- |
| 4 mg/l up | 5,500 sq. ft./lb. NH3 |
| 3 mg/l up | 6,000 sq. ft./lb. NH3 |
| 2 mg/l up | 10,000 sq. ft./lb. NH3 |

EXAMPLE
Assume:

TABLE-continued
RECOMMENDED MAXIMUM LOADING RATE

| | |
| --- | --- |
| Design Flow | 0.030 MGD |
| Plant Effluent NH3 | 10 mg/l |
| Summer NH3 Limit | 2 mg/l |
| Winter NH3 Limit | 3 mg/l |

MEDIA (Fixed Film Reactor)
REQUIRED FOR SUMMER TREATMENT 0.03 MGD[1] × 8.34 × ($10^{-2}$ mg/l) × 4000 sq. ft. = 8,006 sq. ft. media
8006 sq. ft. divided by 175 sq. ft./cf = 45.75 cu. ft. fixed film media MEDIA (Fixed Film Reactor)
REQUIRED FOR WINTER TREATMENT 0.03 MGD × 8.34 × ($10^{-3}$ mg/l) × 6000 sq. ft. = 10,508 sq. ft. media
10,508 sq. ft. divided by 175 sq. ft./cf. = 60.05 cu. ft. media NOTE:
All loading rates and removals are based on USEPA Technology Transfer Manual on Nitrification, Chapter 4.
[1]MGD = million gallons per day

[1]MGD = million gallons per day

As noted hereinbefore, the wedge wire media panel 18 extends the laminar flow conditions throughout the full length of the fixed film 16 reactor media. Although this is contrary to teachings in the field, it has been found that when the reactor is used in combination with the wedge wire panels 18, an extremely efficient system is provided.

No special sludge removal equipment is shown and any conventional means may be utilized.

Having thus described my invention, I claim:

1. In a sewage treatment apparatus having a treatment tank into which effluent to be treated is introduced and then exits said tank after treatment, the improvement comprising, in combination,
   wedge wire panels mounted horizontally in said tank, and
   a fixed film media reactor mounted directly below said wedge wire panels, said media reactor having a plurality of vertical channels therethrough which form a surface for the growth of aerobic microorganisms, and
   means for introducing effluent into said tank and causing said effluent to pass upwardly through said vertical channels and then through said wedge wire panels
   wherein said wedge wire panels and fixed film media reactor are constructed and arranged to establish laminar flow throughout the fixed film media reactor.

2. The apparatus of claim 1 wherein one cubic foot of said fixed film media reactor provides an effluent contact surface area of at least 175 square feet.

3. The apparatus of claim 2 wherein pre-aeration diffusers are included within said tank.

4. The apparatus of claim 1 wherein frame and fastening means secure said wedge wire panels and said media reactor to said tank.

5. The apparatus of claim 4 wherein one cubic foot of said fixed film media reactor provides an effluent contact surface area of at least 175 square feet.

* * * * *

UNITED STATES PATENT AND TRADEMARK OFFICE
CERTIFICATE OF CORRECTION

PATENT NO. : 4,929,349

DATED : May 29, 1990

INVENTOR(S) : William J. Beckman

It is certified that error appears in the above-identified patent and that said Letters Patent is hereby corrected as shown below:

IN THE ABSTRACT

| | LINE 7 | "flow" should be --flows-- |
|---|---|---|
| Col. 1 | Line 63 | the "O" in "B.0.D." is printed with a zero should be printed with letter --O-- |
| Col. 3 | Line 7 | "were used" should not be in bold |
| Col. 3 | Line 58 | after "temperature" insert "7" |
| Col. 4 | Line 21 | delete 2nd footnote |

Signed and Sealed this

Tenth Day of September, 1991

Attest:

HARRY F. MANBECK, JR.

Attesting Officer

Commissioner of Patents and Trademarks